United States Patent
Singh et al.

(10) Patent No.: US 7,220,202 B2
(45) Date of Patent: May 22, 2007

(54) ELECTRICALLY VARIABLE TRANSMISSION WITH IMPROVED GRADEABILITY

(75) Inventors: Tejinder Singh, Canton, MI (US); Henryk Sowul, Oxford, MI (US); James D. Hendrickson, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 185 days.

(21) Appl. No.: 11/131,877

(22) Filed: May 18, 2005

(65) Prior Publication Data

US 2006/0052199 A1    Mar. 9, 2006

Related U.S. Application Data

(60) Provisional application No. 60/607,975, filed on Sep. 8, 2004.

(51) Int. Cl.
*F16H 3/72* (2006.01)
(52) U.S. Cl. .......................................................... 475/5
(58) Field of Classification Search .................... 475/5
See application file for complete search history.

(56) References Cited

U.S. PATENT DOCUMENTS

| | | | | |
|---|---|---|---|---|
| 5,558,595 A | 9/1996 | Schmidt et al. | ................. | 477/3 |
| 5,931,757 A | 8/1999 | Schmidt | ........................ | 475/2 |
| 6,478,705 B1 | 11/2002 | Holmes et al. | ................. | 475/5 |
| 6,527,658 B2 | 3/2003 | Holmes et al. | ................. | 475/5 |
| 2006/0019784 A1* | 1/2006 | Sowul et al. | .................... | 475/5 |
| 2006/0025264 A1* | 2/2006 | Sowul et al. | .................... | 475/5 |
| 2006/0046886 A1* | 3/2006 | Holmes et al. | ................. | 475/5 |
| 2006/0189428 A1* | 8/2006 | Raghavan et al. | ............. | 475/5 |
| 2006/0240929 A1* | 10/2006 | Raghavan et al. | ............. | 475/5 |

* cited by examiner

*Primary Examiner*—Dirk Wright
(74) *Attorney, Agent, or Firm*—Christopher DeVries

(57) ABSTRACT

The present invention provides an electrically variable transmission having two motor/generators, two differential gear sets such as planetary gear sets, and five torque transfer devices arranged to provide improved launch, performance and gradeability, and enabling five fixed speed ratios. An input member is continuously connected to one member (preferably a ring gear) of the first planetary gear set, and an output member is continuously connected to one member (preferably a carrier) of the second planetary gear set. One motor/generator is continuously connected to another member (preferably a sun gear) in the first planetary gear set as well as being selectively connected to a member (preferably a ring gear) of the second planetary gear set. The second motor/generator is continuously connected to the remaining member (preferably a sun gear) of the second planetary gear set, and is selectively connected to the remaining member (preferably a carrier) of the first planetary gear set.

6 Claims, 1 Drawing Sheet

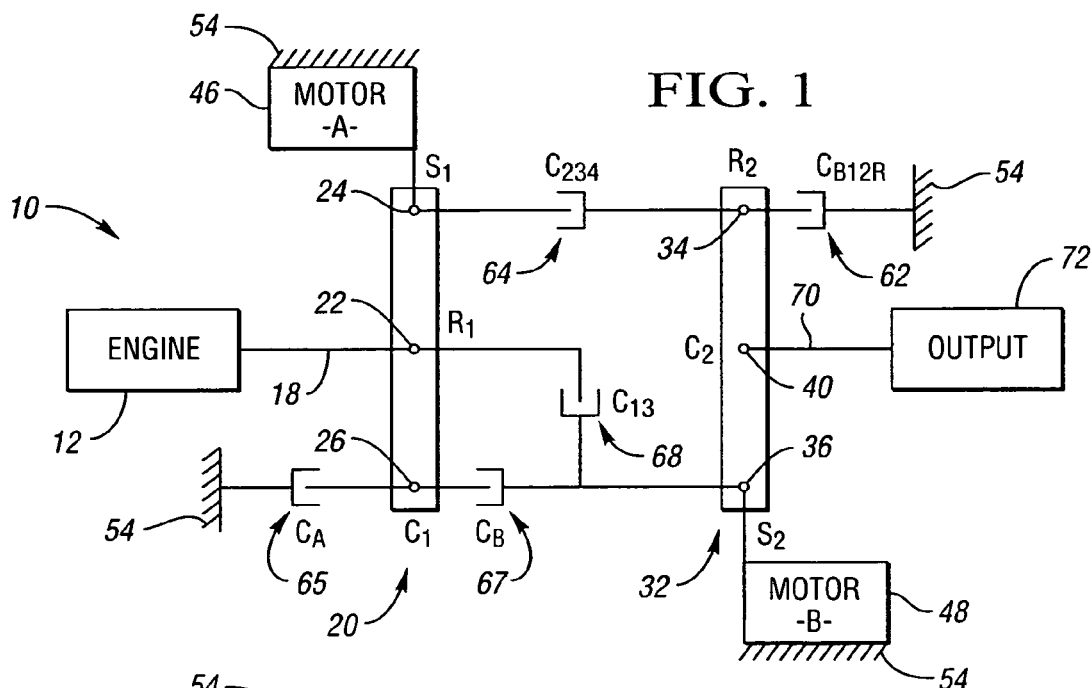
FIG. 1
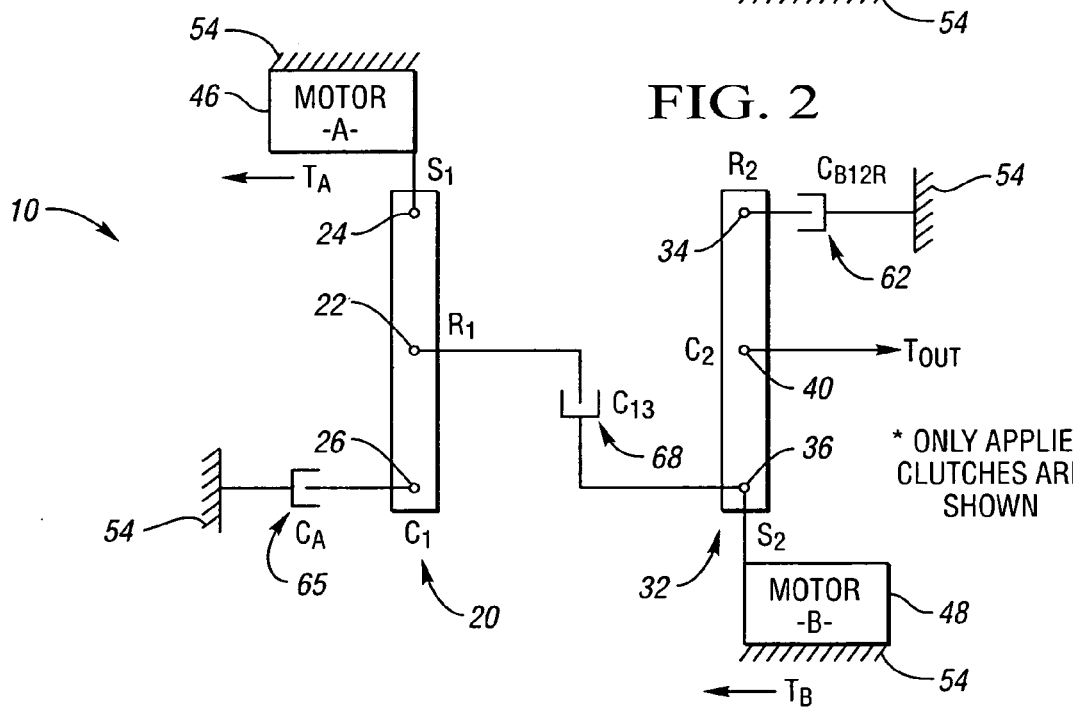
FIG. 2
| FIXED GEAR RATIO | (65) $C_A$ CLUTCH | (64) $C_{234}$ CLUTCH | (68) $C_{13}$ CLUTCH | (62) $C_{B12R}$ CLUTCH | (67) $C_B$ CLUTCH |
|---|---|---|---|---|---|
| 1st |  |  | X | X |  |
| 2nd |  | X |  | X | X |
| 3rd |  | X | X |  | X |
| 4th | X | X | X |  |  |
| 5th | X | X |  |  | X |
FIG. 3

ELECTRICALLY VARIABLE TRANSMISSION WITH IMPROVED GRADEABILITY

CROSS-REFERENCE TO RELATED APPLICATION

This application claims the benefit of U.S. Provisional Application 60/607,975, filed Sep. 8, 2004, which is hereby incorporated by reference in its entirety.

TECHNICAL FIELD

The present invention relates to an electrically variable transmission having two motor/generators, two planetary gear sets, and five torque transfer devices arranged to provide improved launch, performance and gradeability.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between the engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing is a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as described in U.S. Pat. No. 5,931,757, issued Aug. 3, 1999 to Michael R. Schmidt, and commonly assigned with the present application. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output.

The two-range, input-split and compound-split electrically variable transmission may be constructed with two sets of planetary gearing or with three sets of planetary gearing. In addition, some embodiments may utilize three torque transfer devices—two to select the operational mode desired of the transmission and the third selectively to disconnect the transmission from the engine. In other embodiments, all three torque transfer devices may be utilized to select the desired operational mode.

U.S. Pat. No. 6,527,658, issued Mar. 4, 2003 to Holmes et al and commonly assigned with the present application, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention provides an electrically variable transmission having two motor/generators, two differential gear sets such as planetary gear sets, and five torque transfer devices arranged to provide improved launch, performance and gradeability, and enabling five fixed speed ratios. "Gradeability" is a vehicle's ability to climb a grade at a given speed.

A fixed speed ratio is an operating condition in which the mechanical power input to the transmission is transmitted mechanically to output, and no power flow is necessary through the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators.

The invention also provides a new and novel electrically variable transmission, as above, that can be manufactured at a significant cost reduction relative to prior known electrically variable transmissions. The present invention may achieve this through the use of additional clutches to provide fixed speed ratios and therefore allow smaller electrical components, and the use of only two planetary gear sets, the minimum for a compound power split arrangement.

These and other aspects of the invention, as well as the advantages thereof over existing and prior art forms, which will be apparent in view of the following detailed specification, are accomplished by means hereinafter described and claimed.

By way of a general introductory description, an electrically variable transmission embodying the concepts of the present invention has an input member to receive power from an engine and an output member to deliver power to the drive members that propel the vehicle. There are first and second motor/generators as well as first and second planetary gear sets. Each planetary gear set has an inner gear member and an outer gear member that meshingly engages a plurality of planet gear members rotatably mounted on a carrier. The input member is continuously connected to one member (preferably a ring gear) of the first planetary gear set, and the output member is continuously connected to one member (preferably a carrier) of the second planetary gear set. One motor/generator is continuously connected to another member (preferably a sun gear) in the first planetary gear set as well as being selectively connected to a member (preferably a ring gear) of the second planetary gear set. The second motor/generator is continuously connected to the remaining member (preferably a sun gear) of the second planetary gear set, and is selectively connected to the remaining member (preferably a carrier) of the first planetary gear set.

Preferably, the first planetary gear set is a compound planetary gear set, and the second planetary gear set is a simple planetary gear set.

A first torque transfer device (CB12R) selectively grounds the ring gear of the second planetary gear set, and a second torque transfer device (C234) selectively connects the ring gear of the second planetary gear set to the sun gear of the first planetary gear set as well as to the rotor of one motor/generator.

A third torque transfer device (CA) selectively connects the carrier of the first planetary gear set to ground.

A fourth torque transfer device (CB) selectively connects the carrier of the first planetary gear set to the sun gear of the second planetary gear set.

A fifth torque transfer device (C13) selectively connects the ring gear of the first planetary gear set with the sun gear of the second planetary gear set.

Preferably, the first, third and fifth torque transfer devices are engaged during launch so that the first and second planetary gear sets operate in underdrive to increase torque output to the output member.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic lever diagram representing one preferred form of an electrically variable transmission embodying the concepts of the present invention;

FIG. 2 is a partial schematic lever diagram illustrating only those torque transmitting mechanisms which are engaged during battery-only launch in the lever diagram of FIG. 1 to illustrate torque multiplication; and FIG. 3 is a chart illustrating clutching engagements for fixed speed ratio operation of the transmission represented by the lever diagram of FIG. 1.

DESCRIPTION OF THE PREFERRED EMBODIMENTS

An electromechanical transmission is described in commonly assigned U.S. Provisional Ser. No. 60/590,427, entitled "Electrically Variable Transmission with Selective Fixed Ratio Operation," by Holmes et al., filed Jul. 22, 2004, and hereby incorporated by reference in its entirety.

With reference to the lever diagram of FIG. 1, a preferred embodiment of the improved electrically variable transmission is designated generally by the numeral 10. Transmission 10 is designed to receive at least a portion of its driving power from an engine 12. The engine 12 has an output shaft that may also serve as the forward input member of a transient torque damper (not shown). Transient torque dampers are well known in this art, but irrespective of the particular transient torque damper employed, the output member thereof serves as the input member 18 of the transmission 10.

In the embodiment depicted, the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 18, the transmission input member 18 is operatively connected to a compound planetary gear set 20 in the transmission 10.

The transmission 10 utilizes two differential gear sets, preferably in the nature of planetary gear sets. The first planetary gear set 20 is a planetary gear set. It employs an outer gear member 22, typically designated as the ring gear, which circumscribes an inner gear member 24, typically designated as the sun gear. A carrier 26 rotatably supports a plurality of planet gears such that one set of planet gears meshingly engages the outer, ring gear member 22 and another set of planet gears meshingly engages the inner, sun gear member 24 of the first planetary gear set 20. The input member 18 is secured to the ring gear member 22 of the first planetary gear set 20.

The second planetary gear set 32 is a simple planetary gear set, and also has an outer gear member 34, often also designated as the ring gear, that circumscribes an inner gear member 36, also often designated as the sun gear. A plurality of planet gears are also rotatably mounted in a carrier 40 such that each planet gear member simultaneously, and meshingly, engages both the outer, ring gear member 34 and the inner, sun gear member 36 of the second planetary gear set 32.

The preferred embodiment 10 also incorporates first and second motor/generators 46 and 48, respectively. The stator of the first motor/generator 46 is secured to the transmission housing 54. The rotor of the first motor/generator 46 is secured the inner, sun gear 24 of the first planetary gear set 20.

The stator of the second motor/generator 48 is also secured to the transmission housing 54. The rotor of them second motor/generator 48 is secured to the sun gear 36 of the second planetary gear set 32.

The two planetary gear sets 20 and 32 as well as the two motor/generators 46 and 48 may be coaxially oriented. This configuration assures that the overall envelope—i.e., the circumferential dimension—of the transmission 10 may be minimized.

The ring gear 34 of the second planetary gear set 32 is selectively grounded to the housing 54, as by a first clutch means in the nature of a torque transfer device 62 (CB12R). That is, the grounded ring gear 34 is selectively secured against rotation by an operative connection to the non-rotatable housing 54. The ring gear 34 of the second planetary gear set 32 is also selectively connected to the sun gear 24 of the first planetary gear set 20, as by a second clutch means in the nature of a torque transfer device 64 (C234). The first and second torque transfer devices 62 and 64 are employed to assist in the selection of the operational modes of the hybrid transmission 10.

A third torque transfer device 65 (CA) selectively connects the carrier 26 with the transmission housing 54.

A fourth torque transfer device 67 (CB) selectively connects the carrier 26 to the sun gear 36. A fifth torque transfer device 68 (C13) selectively connects the ring gear 22 with the sun gear 36.

The output drive member 70 of the transmission 10 is secured to the carrier 40 of the second planetary gear set 32, for transmitting power to the final drive 72.

Returning now to the description of the power sources, it should be apparent from the foregoing description, and with particular reference to FIG. 1, that the transmission 10 selectively receives power from the engine 12. As described in the above-referenced U.S. Provisional Ser. No. 60/590,427, the hybrid transmission also receives power from an electric power source. The electric power source may be one or more batteries. Other electric power sources, such as fuel cells, that have the ability to provide, or store, and dispense electric power may be used in place of batteries without altering the concepts of the present invention.

The electric power source communicates with an electrical control unit (ECU) by electrical transfer conductors. The ECU communicates with the first motor/generator 46 and the second motor/generator 48 via electrical transfer conductors.

FIG. 2 is a partial lever diagram illustrating only those torque transfer devices which are engaged during battery-only launch (in forward or reverse) for the transmission 10 of FIG. 1 in order to illustrate torque multiplication. Lever diagrams are commonly used to represent planetary gear arrangements, as described in SAE paper 810102, "The Lever Analogy: A New Tool in Transmission Analysis", Feb. 23, 1981.

As shown in FIG. 2, in battery-only launch, the torque transfer devices 62, 65 and 68 are engaged. In this configuration the lever associated with the first planetary gear set 20 operates in underdrive mode and multiples the torque of motor/generator 46. This torque is represented by the following formula: $T(R1)=T(A)*(R1/S1)$, where $T(R1)$ is the torque at ring gear 22, $T(A)$ is the torque of motor/generator 56, and $R1/S1$ is the ring gear/sun gear tooth ratio of the planetary gear set 20. This torque $T(A)$ is transmitted to the sun gear 36 via the torque transfer device 68. Hence, the total torque at the sun gear 36 is $T(S2)=(T(A)*(R1/S1)+T(B))$, where $T(A)$ is the torque of motor/generator 56, $R1/S1$ is the ring gear/sun gear tooth ratio of the planetary gear set 20, and $T(B)$ is the torque of motor/generator 48.

The lever associated with the second planetary gear set 32 multiplies the torque of the sun gear 36 because it is operating in underdrive. The output torque is therefore: $T(OUT)=(T(A)*(R1/S1)+T(B))*(1+R2/S2)$, where $T(A)$ is the torque of motor/generator 56, $R1/S1$ is the ring gear/sun gear tooth ratio of the planetary gear set 20, $T(B)$ is the torque of motor/generator 48, and $R2/S2$ is the ring gear/sun gear tooth ratio of the planetary gear set 32.

Therefore, both levers work in underdrive mode, and hence deliver a higher value of output torque than the total torque input by the motor/generators 46 and 48. This higher value of output torque results in improved launch, performance and gradeability. The launch direction can be switched from reverse to forward, and vice versa, by simply reversing the motor direction.

FIG. 3 shows a chart illustrating clutching engagements for fixed speed ratio operation of the transmission represented by the lever diagram of FIG. 1. For example, in the first fixed speed ratio the torque transfer devices 68 and 62 are engaged, and in the fifth fixed forward speed ratio the torque transfer devices 65, 64 and 67 are engaged.

While only the preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

The invention claimed is:

1. An electrically variable transmission comprising:
an input member to receive power from an engine;
an output member;
first and second motor/generators;
first and second differential gear sets each having first, second and third members;
said input member being continuously connected to said first member of said first gear set, and said output member being continuously connected to said first member of said second gear set;
said first motor/generator being continuously connected to said second member of said first gear set;
said second motor/generator being continuously connected with said third member of said second gear set;
a first torque transfer device selectively grounding said second member of said second gear set;
a second torque transfer device selectively connecting said second member of said second gear set to said first electric motor/generator;
a third torque transfer device selectively grounding said third member of said first gear set;
a fourth torque transfer device selectively connecting said third member of said first planetary gear set with said third member of said second planetary gear set; and
a fifth torque transfer device selectively connecting said first member of said first planetary gear set with said third member of said second planetary gear set.

2. The electrically variable transmission of claim 1, wherein said first and second differential gear sets are planetary gear sets, and wherein said first, second and third members of said first gear set comprise a ring gear, sun gear and carrier, respectively, and said first, second and third members of said second gear set comprise a carrier, ring gear and sun gear respectively.

3. The electrically variable transmission of claim 2, wherein said first planetary gear set is a compound planetary gear set, and said second planetary gear set is a simple planetary gear set.

4. The electrically variable transmission of claim 3, wherein said first, third and fifth torque transfer devices are engaged during launch so that said first and second planetary gear sets operate in underdrive to increase torque output to said output member.

5. An electrically variable transmission comprising:
an input member to receive power from an engine;
an output member;
first and second motor/generators;
a first, compound planetary gear set having a ring gear, a carrier and a sun gear;
a second, simple planetary gear set having a ring gear, a carrier and a sun gear;
said input member being continuously connected to said ring gear of said first gear set, and said output member being continuously connected to said carrier of said second gear set;
said first motor/generator being continuously connected to said sun gear of said first gear set;
said second motor/generator being continuously connected with said sun gear of said second gear set;
a first torque transfer device selectively grounding said ring gear of said second gear set;
a second torque transfer device selectively connecting said ring gear of said second gear set to said sun gear of said first planetary gear set;
a third torque transfer device selectively grounding said carrier of said first gear set;
a fourth torque transfer device selectively connecting said carrier of said first planetary gear set with said sun gear of said second planetary gear set; and
a fifth torque transfer device selectively connecting said ring gear of said first planetary gear set with said sun gear of said second planetary gear set.

6. The electrically variable transmission of claim 5, wherein said first, third and fifth torque transfer devices are engaged during launch so that said first and second gear sets operate in underdrive to increase torque output to said output member.

* * * * *